United States Patent
Asahi

(10) Patent No.: US 7,031,033 B2
(45) Date of Patent: Apr. 18, 2006

(54) DATA COMMUNICATION APPARATUS

(75) Inventor: Takako Asahi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 09/938,574

(22) Filed: Aug. 27, 2001

(65) Prior Publication Data

US 2002/0054364 A1 May 9, 2002

(30) Foreign Application Priority Data

Aug. 31, 2000 (JP) ............................. 2000-262653

(51) Int. Cl.
*H04N 1/04* (2006.01)
(52) U.S. Cl. ...................................... 358/479; 358/485
(58) Field of Classification Search ................ 358/400, 358/1.15, 507, 471, 479, 485; 445/36, 37, 445/566, 553.1; 348/14.07; 345/581, 650, 345/123
See application file for complete search history.

(56) References Cited

U.S. PATENT DOCUMENTS

| | | | |
|---|---|---|---|
| 5,887,187 A | * | 3/1999 | Rostoker et al. ............... 712/29 |
| 6,026,309 A | * | 2/2000 | Moon et al. .................. 455/566 |
| 6,424,843 B1 | * | 7/2002 | Reitmaa et al. .............. 455/566 |
| 2002/0010658 A1 | * | 1/2002 | Suzuki et al. ................. 705/28 |
| 2003/0105765 A1 | * | 6/2003 | Smith et al. ................. 707/100 |

FOREIGN PATENT DOCUMENTS

| | | | |
|---|---|---|---|
| JP | 10-028187 | | 1/1998 |
| JP | 11-103378 | | 4/1999 |
| JP | 41119926 | * | 4/1999 |
| JP | 11-289413 | | 10/1999 |
| JP | 2000-10701 | * | 1/2000 |
| JP | 2001-144892 | | 5/2001 |
| JP | 2002152447 | * | 5/2002 |

* cited by examiner

*Primary Examiner*—Jerome Grant, II
(74) *Attorney, Agent, or Firm*—Fitzpatrick, Cella, Harper & Scinto

(57) ABSTRACT

A data communication apparatus comprises a memory for storing plural data, a transmitter for transmitting the plural stored data, a display for displaying situations of the plural stored data, and a controller for performing, in case of displaying the situations, control to change order of display of the data being transmitted. Thus, the data being transmitted can be easily specified from among the plural stored data, the data being transmitted can be easily specified by changing display forms, the data being transmitted can be easily specified by shifting them to the head of a list and displaying this list, and the data being transmitted can be easily specified by automatically scrolling a display area thereof.

25 Claims, 10 Drawing Sheets

FIG. 3A

| [TRANSMISSION STATUS SCREEN] | | | | |
|---|---|---|---|---|
| ACCEPTANCE TIME | DESTINATION / ABBREVIATION | TRANSMISSION NO. | TRANSMISSION SITUATION | |
| 10:00 | DESTINATION I 03 1111 1111 | 0001 | IN TRANSMISSION | ← DOCUMENT 1 |
| 10:30 | DESTINATION II 03 2222 2222 | 0007 | IN TRANSMISSION | ← DOCUMENT A |
| 10:05 | DESTINATION I 03 1111 1111 | 0002 | IN TRANSMISSION | ← DOCUMENT 2 |
| 10:10 | DESTINATION I 03 1111 1111 | 0003 | IN TRANSMISSION | ← DOCUMENT 3 |
| 10:15 | DESTINATION I 03 1111 1111 | 0004 | IN TRANSMISSION | ← DOCUMENT 4 |

FIG. 3B

| [TRANSMISSION STATUS SCREEN] | | | | |
|---|---|---|---|---|
| ACCEPTANCE TIME | DESTINATION / ABBREVIATION | TRANSMISSION NO. | TRANSMISSION SITUATION | |
| 10:20 | DESTINATION I 03 1111 1111 | 0005 | IN TRANSMISSION | ← DOCUMENT 5 |
| 10:25 | DESTINATION I 03 1111 1111 | 0006 | IN TRANSMISSION | ← DOCUMENT 6 |

FIG. 8

[TRANSMISSION STATUS SCREEN]     1/2

| ACCEPTANCE TIME | DESTINATION / ABBREVIATION | TRANSMISSION NO. | TRANSMISSION SITUATION | |
|---|---|---|---|---|
| 10:00 | DESTINATION I 03 1111 1111 | 0001 | IN TRANSMISSION | ← DOCUMENT 1 |
| 10:25 | DESTINATION II 03 2222 2222 | 0006 | IN TRANSMISSION | ← DOCUMENT 6 |
| 10:35 | DESTINATION III test@canon.co.jp | 0007 | IN TRANSMISSION | ← DOCUMENT 8 |
| 10:05 | DESTINATION I 03 1111 1111 | 0002 | IN TRANSMISSION | ← DOCUMENT 2 |
| 10:10 | DESTINATION I 03 1111 1111 | 0003 | IN TRANSMISSION | ← DOCUMENT 3 |

[FAX] [I FAX] [ftp]     [ALL]

FIG. 9

[TRANSMISSION STATUS SCREEN]     2/2

| ACCEPTANCE TIME | DESTINATION / ABBREVIATION | TRANSMISSION NO. | TRANSMISSION SITUATION | |
|---|---|---|---|---|
| 10:15 | DESTINATION I 03 1111 1111 | 0004 | IN TRANSMISSION | ← DOCUMENT 4 |
| 10:20 | DESTINATION I 03 1111 1111 | 0005 | IN TRANSMISSION | ← DOCUMENT 5 |
| 10:30 | DESTINATION IV 03 3333 3333 | 0008 | IN WAIT FOR TRANSMISSION | ← DOCUMENT 7 |

[FAX] [I FAX] [ftp]     [ALL]

FIG. 10

[FAX TRANSMISSION STATUS SCREEN]     1/2

| ACCEPTANCE TIME | DESTINATION / ABBREVIATION | TRANSMISSION NO. | TRANSMISSION SITUATION | |
|---|---|---|---|---|
| 10:00 | DESTINATION I 03 1111 1111 | 0001 | IN TRANSMISSION | ← DOCUMENT 1 |
| 10:25 | DESTINATION II 03 2222 2222 | 0006 | IN TRANSMISSION | ← DOCUMENT 6 |
| 10:05 | DESTINATION I 03 1111 1111 | 0002 | IN TRANSMISSION | ← DOCUMENT 2 |
| 10:10 | DESTINATION I 03 1111 1111 | 0003 | IN TRANSMISSION | ← DOCUMENT 3 |
| 10:15 | DESTINATION I 03 1111 1111 | 0004 | IN TRANSMISSION | ← DOCUMENT 4 |

[FAX] [I FAX] [ftp]     [ALL]

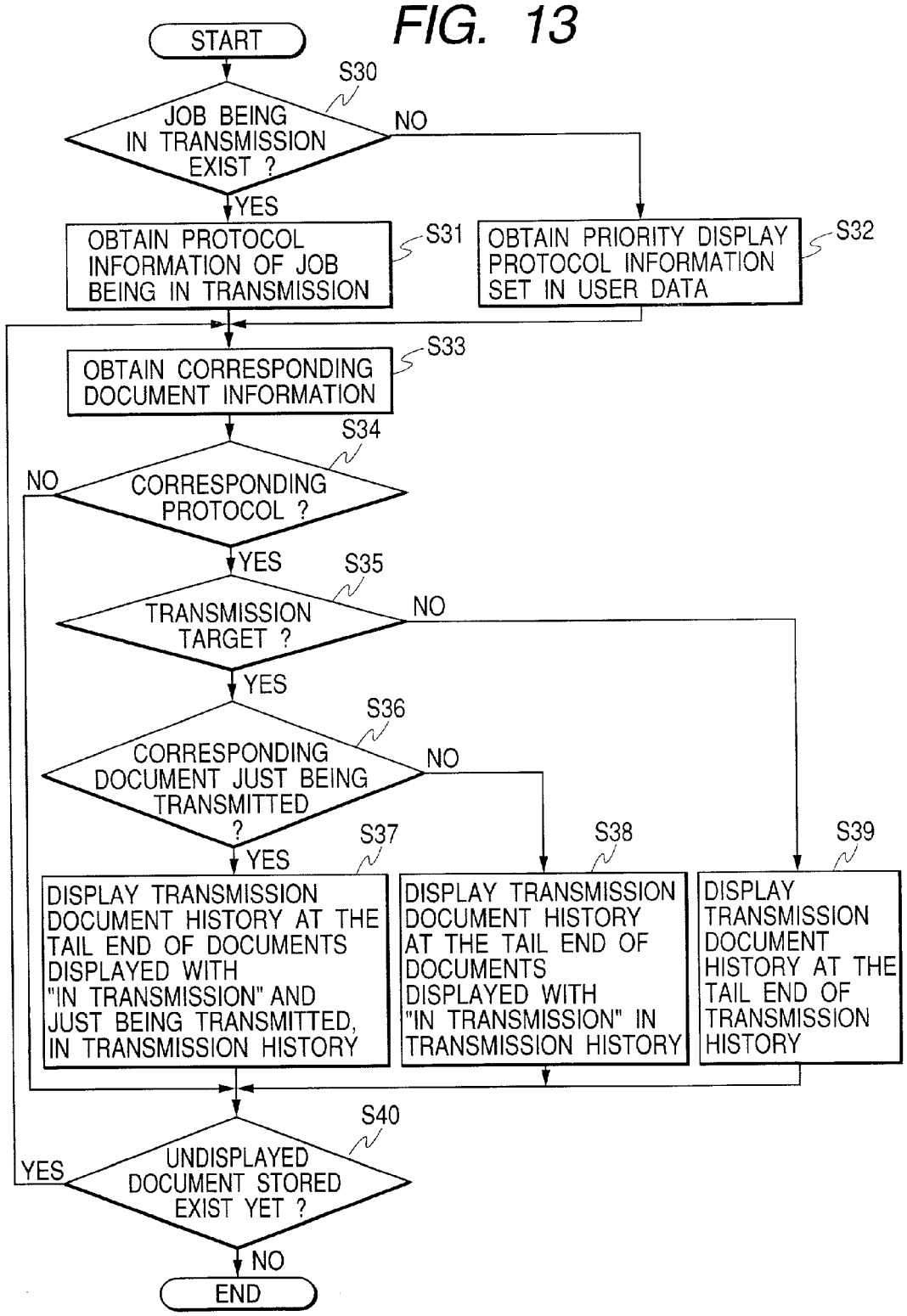

DATA COMMUNICATION APPARATUS

BACKGROUND OF THE INVENTION

1. Field of the Invention

The present invention relates to a data communication apparatus which transmits data stored in a memory, and more particularly, to a data communication apparatus which can display situations of plural transmission-target data stored in a memory.

2. Related Background Art

Conventionally, a facsimile apparatus which stores plural documents in a memory and sequentially transmits the stored documents to a communication partner has been known.

In such the facsimile apparatus, there is a type which causes a display panel on an operation unit to display situations (transmission is being waited, transmission is being performed, transmission has been ended, etc.) of the documents stored in the memory.

Conventionally, when the situations of the documents stored in the memory are displayed, a document list on which the plural stored documents are sequentially put from the top to the bottom or from the bottom to the top in the order of memory storage (i.e., the order that these documents were stored in the memory) is displayed.

Incidentally, in a data communication apparatus such as the facsimile apparatus, plural documents stored in a memory are not necessarily transmitted in the order of storage. Namely, for example, when the document can not be transmitted because a communication partner is busy, this document is entered into a redial standby state, and thus the order of transmitting this document is deferred, whereby the order that the documents are stored in the memory differs from the order that the documents stored in the memory are transmitted. Further, when timer transmission is designated and this document is thus transmitted after the document later stored in the memory is transmitted, the order of storing the documents differs from the order of transmitting the stored documents. Further, when the document later stored in the memory is subjected to batch transmission (i.e., the transmission that the plural documents for an identical destination are all extracted and transmitted at one time) and thus first transmitted, the order of storing the documents differs from the order of transmitting the stored documents.

In these cases, when the situations of the documents stored in the memory are displayed, conventionally, since the document list on which the documents are sequentially put in the order of memory storage is displayed, the document at the head of the list (i.e., the uppermost document or the lowermost document on the list) might not be the document which is being transmitted.

Thus, for example, when it is intended to stop the transmission of the document being transmitted, there is a problem that it is difficult to specify this document.

Especially, since the display panel on the operation unit is small, it might be impossible to display all the listed documents on this panel. In this case, there is a problem that, since it is necessary to scroll the display panel to search the target document, such an operation is complicated.

Further, when the facsimile apparatus is connected to plural lines, or when the facsimile apparatus is a data communication apparatus which supports plural protocols, there is a problem that it is further difficult to specify the target document.

SUMMARY OF THE INVENTION

An object of the present invention is to provide a data communication apparatus which solved the above conventional problems.

Another object of the present invention is to provide a data communication apparatus in which data being transmitted can be easily specified from among plural data stored in a memory.

Still another object of the present invention is to provide a data communication apparatus in which data being transmitted can be easily specified by changing display forms of plural data stored in a memory.

Still another object of the present invention is to provide a data communication apparatus in which data being transmitted can be easily specified by shifting from among plural data stored in a memory the data being transmitted to the head of a list and displaying this list.

Still another object of the present invention is to provide a data communication apparatus in which data being transmitted can be easily specified by automatically scrolling a display area to display thereon, from among plural data stored in a memory, the data being transmitted.

Other objects and features of the present invention will become apparent from the following detailed description and the attached drawings.

BRIEF DESCRIPTION OF THE DRAWINGS

FIGS. 3A and 3B are diagrams showing a transmission situation screen displayed on a display 16 of the DC 1;

FIG. 8 is a diagram showing a transmission situation screen displayed on a display 2013 of the digital multifunctional machine 1001;

FIG. 9 is a diagram showing a transmission situation screen displayed on the display 2013 of the digital multifunctional machine 1001;

FIG. 10 is a diagram showing a facsimile transmission situation screen displayed on the display 2013;

FIG. 13 is a flow chart showing an operation to cause the display 2013 to display the transmission situation for a protocol of an in-transmission job or a previously set job.

DETAILED DESCRIPTION OF THE PREFERRED EMBODIMENTS

Hereinafter, the embodiments of the present invention will be explained with reference to the attached drawings.

(First Embodiment)

Figure 1:
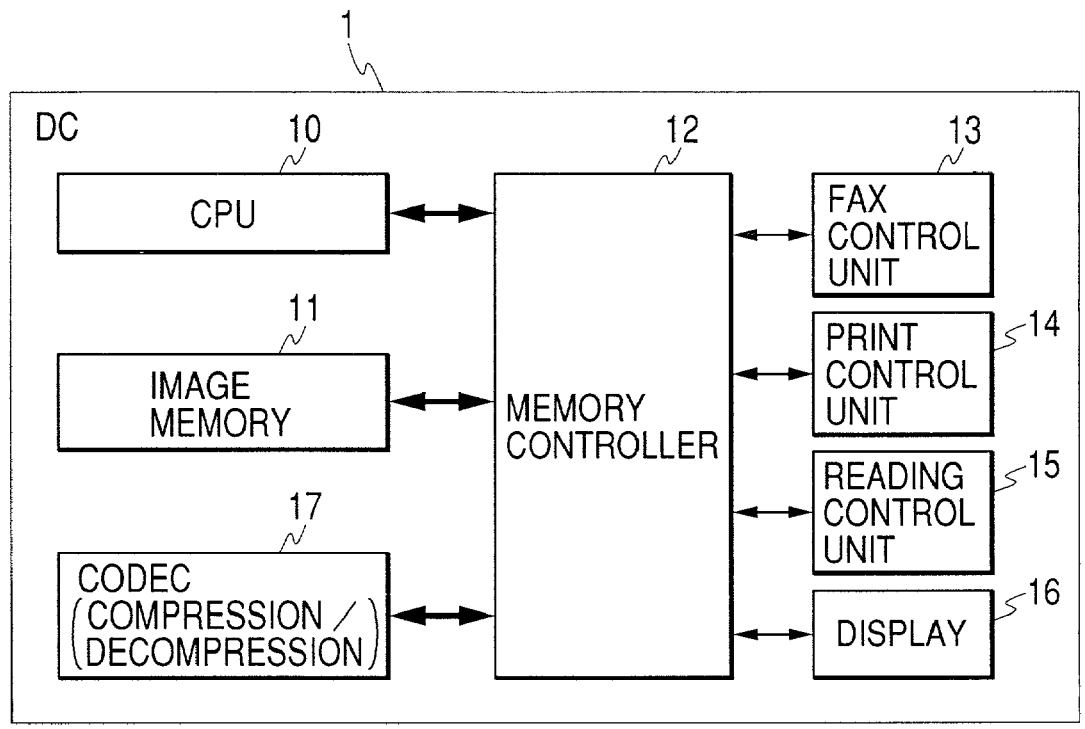
FIG. 1 is a block diagram showing a schematic structure of a DC (digital copier or digital copying machine) 1 according to the first embodiment of the present invention.

FIG. 1 is a block diagram showing a DC 1 according to the first embodiment of the present invention. The DC 1 has three functions, i.e., a copying function, a facsimile function, and a print function.

The DC 1 contains a CPU (central processing unit) 10, an image memory 11, a memory controller 12, a facsimile control unit 13, a print control unit 14, a reading control unit 15, a display 16, and a codec 17.

The image memory 11 is a memory area which stores various data. In the image memory 11, plural facsimile transmission documents (i.e., the documents to be transmitted by the facsimile apparatus) such as a document obtained by reading an image on an original with the reading control unit 15, a document received by the facsimile control unit 13, and the like can be stored.

The memory controller 12 receives data from the facsimile control unit 13 and the like, causes the codec 17 to compress the received data, again receives the compressed data from the codec 17, allocates the area in the image memory 11 to which the compressed data should be stored, and then transfers the compressed data to the image memory 11. Conversely, the memory controller 12 receives the data from each area in the image memory 11, transfers the received data to the codec 17 to decompress or expand it, again receives the decompressed data from the codec 17, and then transfers the received data to the respective control units.

The facsimile control unit 13 controls the facsimile function, and exchanges the data with the memory controller 12. Further, the facsimile control unit 13 holds plural telephone lines, and thus can perform plural communications simultaneously by using these lines. When the plural transmission documents for an identical destination exist in the image memory 11, the facsimile control unit 13 can batch and transmit these documents in one-time communication.

The print control unit 14 controls a print job, and exchanges the data with the memory controller 12.

The reading control unit 15 controls the reading function, and exchanges the data with the memory controller 12.

The display 16 is a liquid crystal display unit which displays various information (a facsimile situation, no sheet (paper), an ink empty, etc.) on the basis of the information received from the memory controller 12. When the facsimile situation is displayed, histories (situations) of the plural transmission documents can be simultaneously displayed on one screen. If the histories of all the transmission documents can not be displayed on one screen, the screen is scrolled by a predetermined operation to display the histories of all the transmission documents. The history of the transmission document includes an acceptance time (a time when the transmission document is stored in the image memory 11), a destination name, a facsimile number, a transmission number to specify the transmission document, and a transmission situation. Here, in the transmission situation, when the transmission is started for one transmission document, a message "IN TRANSMISSION" to which shading has been applied is displayed for this document. In case of batch transmission, shading is applied only to the documents which are being transmitted actually, but shading is not applied to the documents which are the batch transmission targets but on standby for transmission, i.e., only the message "IN TRANSMISSION" is displayed for such the documents which are not yet actually batch-transmitted. Further, a message "IN WAIT FOR TRANSMISSION" is displayed for the document which is not yet subjected to the transmission process. Further, since it is set that the document remains in the image memory 11 even after the transmission process was performed, a message "TRANSMISSION END" is displayed for such the document remaining after the transmission. This liquid crystal display unit adopts a touchscreen. Thus, by selecting and touching the document displayed on the touchscreen, it is possible to stop transmitting the selected document, instruct the print control unit 14 to print the selected document, and change the displayed content to the detailed information of the selected document.

The codec 17 receives the data from the memory controller 12, compresses and/or decompresses the received data, and then returns the compressed and/or decompressed data to the memory controller 12.

Next, the operation according to the present embodiment will be explained.

Here, it is assumed that the facsimile apparatus shown in FIG. 1 holds the two lines, transmits documents 1, 2, 3, 4, 5 and 6 to a destination I by using a line 1, and transmits a document A to a destination II by using a line 2. The transmission to the destination I is the batch transmission, and the transmission process is performed to each destination. Here, a state that the transmission process starts processing is called "IN TRANSMISSION", and a state that the transmission is just being performed (i.e., a state that the document is electrically flowing on the telephone line) is especially called "IN TRANSMISSION EXECUTION". If it is not noticed, both "IN TRANSMISSION" and "IN TRANSMISSION EXECUTION" are assumed to be "IN TRANSMISSION".

Here, it is assumed that the documents 1 and A are being transmitted to the destinations I and II, respectively.

Figure 2:
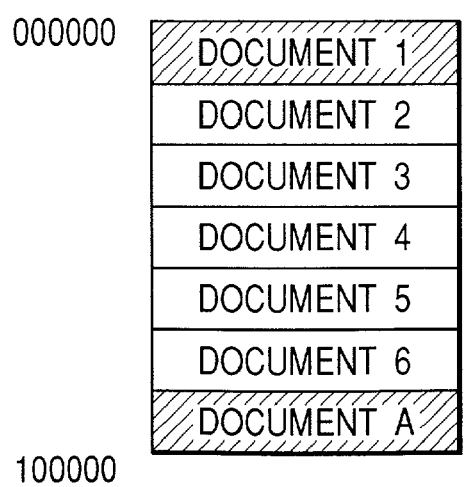
FIG. 2 is a diagram showing an example of documents stored in a memory controller 12 of the DC 1.

FIG. 2 shows an example of the contents of the documents stored in the memory controller 12 according to the present embodiment. In FIG. 2, it should be noted that the document to which slashes have been added (called a shading document hereinafter) is the document which is being transmitted.

FIG. 2 shows a state that the facsimile transmission documents 1, 2, 3, 4, 5, 6 and A are stored in the image memory 11.

In this case, it should be noted that the documents have been input into the image memory 11 in the order of 1→2→3→4→5→6→A. Before the documents are actually transmitted, when a transmission situation screen is displayed on the display 16, the documents are sequentially displayed downward in the above input order. Then, the transmission of the document 1 is started through the line 1, and the storage area is not changed even if the transmission of the document A is started through the line 2.

FIGS. 3A and 3B show the transmission situation screen displayed on the display 16.

Namely, FIG. 3A shows the first page of the transmission situation screen, and FIG. 3B shows the second page thereof.

Here, in the transmission situations (the transmission histories) on the display 16, the histories of the five documents are displayed on the first page of the screen. If the transmission histories of the documents exceeding five histories are to be displayed, the transmission situation screen is scrolled by a predetermined operation, whereby the histories of the documents incapable of being displayed on the first page are displayed on the next page scrolled (i.e., the second page).

In the above case, until the transmission is started, the documents are displayed on the transmission situation screen in the order that these documents were stored in the image memory 11. In a case where the order remains even after the start of transmission and it is intended to stop transmitting the document A to the destination II, there is a possibility that necessity for scrolling the screen comes out in order to search the history of the document A existing after the documents 2 to 6 prestored in the image memory 11.

In the present embodiment, as shown in FIG. 3A, since the documents being transmitted are shifted uppermost and displayed on the transmission situation screen, such the documents are displayed at the head (i.e., the uppermost part) of the first page of the screen, whereby the transmission to the destination II using the line 2 can be easily stopped. On this display, an operator can instruct to stop the transmission by touching a desired document. If it is instructed to stop the transmission of the shading document, such the transmission is ended at the page for which the transmission has been just started, and then the line is disconnected. On the other hand, if it is instructed to stop the transmission of the document other than the shading document, the transmission process is ended before such the transmission is actually started. As previously described, it should be noted that the shading document is the document which is just being transmitted ("IN TRANSMISSION EXECUTION").

When the batch transmission is started, the documents to be batched and transmitted (i.e., all the documents being the transmission targets in the current transmission process) are displayed with the message "IN TRANSMISSION" on the screen, and the documents (the documents 1 and A in this case) being actually transmitted are displayed at the uppermost part. If the transmission of the document 1 ended and the transmission of the document 2 starts, the history of the document 2 is shifted upward. Although it is not shown in the drawings, even if the transmission standby document to the other destination exists between the documents 1 and 2, the document 2 is shifted to skip over it. Further, if it is instructed to stop the transmission without selecting any specific document, the documents being actually transmitted (i.e., the shading documents) are the targets for which the transmission should be stopped. In this case, if the two documents are being transmitted respectively by using the two lines, an inquiry which transmission of the document should be stopped is displayed. Then, when it is instructed to stop the transmission, the documents other than the already-transmitted documents become retransmission targets.

Next, an operation to display facsimile transmission histories in the present embodiment will be explained.

Figure 4:
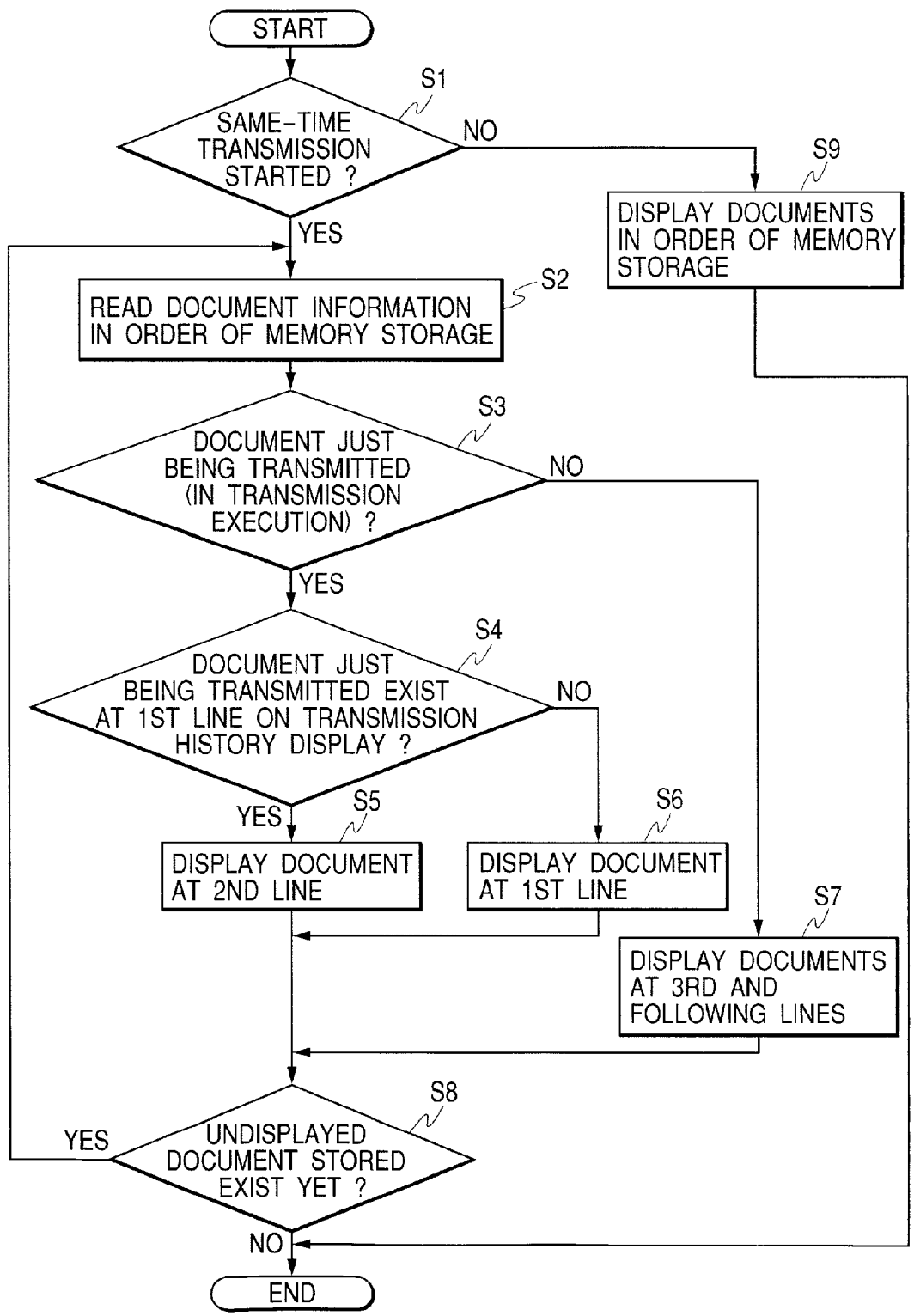
FIG. 4 is a flow chart showing an operation to cause the display 16 to display a transmission situation.

FIG. 4 is a flow chart showing the operation to cause the display 16 to display the facsimile transmission histories. It should be noted that this flow chart is based on the control by the CPU 10 according to programs stored in the memory controller 12.

First, it is detected whether or not same-time transmission including the batch transmission of the plural documents has been started (S1). If it is detected that the same-time transmission including the batch transmission has been started (S1), information of the documents stored and subjected to the batch transmission is read in the order that these documents were stored in the image memory 11 (S2). Then, it is judged whether or not the read information corresponds to the document just being transmitted (i.e., the document being flowing on the telephone line) (S3). If judged that the read information corresponds to the document just being transmitted (S3), then it is further judged whether or not the history of the document just being transmitted is displayed at the first line of the histories of the transmission documents (S4).

If judged that the history of the document just being transmitted is displayed at the first line of the histories of the transmission documents (S4), the history of the transmission document obtained in the step S2 is displayed at the second line of the histories of the transmission documents (S5). Conversely, if judged that the history of the document just being transmitted is not displayed at the first line of the histories of the transmission documents (S4), the history of the transmission document obtained in the step S2 is displayed at the first line of the histories of the transmission documents (S6).

On the other hand, if judged that the read information does not correspond to the document just being transmitted (S3), the read documents are sequentially displayed at the third and the following lines of the histories of the transmission documents (S7).

If the stored document not yet displayed on the transmission situation screen exists (S8), the information of the documents stored and subjected to the batch transmission is read in the order that these documents were stored in the image memory 11 (S2).

On the other hand, if it is detected that the same-time transmission including the batch transmission is not yet started (S1), the histories of the transmission documents are displayed on the transmission situation screen as they are in the order that these documents were stored in the image memory 11 (S9).

It should be noted that the present embodiment is applicable to an image communication apparatus other than the facsimile apparatus (i.e., a personal computer having an image communication function, or the like).

Further, it should be noted that the present embodiment can be grasped as a computer-readable storage medium. Namely, the present embodiment is directed to an example of the computer-readable storage medium which stores a program to cause a computer to perform a transmission procedure of transmitting the plural documents stored in the memory, a situation display procedure of simultaneously displaying the histories representing the situations of the plural transmission documents, and a display control procedure of displaying, when the histories of the transmission documents stored in the memory are displayed, the documents just being transmitted uppermost.

In this case, the situation display procedure is the procedure of sequentially displaying the documents not being transmitted, in the order of storage. Further, the situation display procedure is the procedure of displaying the histories incapable of being displayed at one time, by scrolling the screen. Further, the transmission procedure is the procedure of simultaneously transmitting the plural documents through the plural lines, and the display control procedure is the procedure of displaying uppermost the histories of the plural transmission documents just being transmitted while enabling discrimination of the used lines respectively. Further, the transmission procedure is the procedure capable of batching and transmitting the plural different documents, and the situation display procedure is the procedure of displaying the respective documents discriminably.

Incidentally, an FD (floppy disk), a CD (compact disk), a DVD (digital versatile disk), an HD (hard disk), a semiconductor memory or the like is applicable as the storage medium.

In the present embodiment, the document just being transmitted is shifted uppermost and displayed. Conversely, such the document may be shifted lowermost and displayed.

Further, the order of display is shifted in the present embodiment. However, it is possible to set the order of display to be the same as the order of storage, and automatically perform scroll of the screen according to the start of document transmission so as to display the document just being transmitted within the display area of the display 16. In this case, if the used apparatus holds the two lines as in the present embodiment, it is necessary to add an operation to designate that the document being transmitted by using which line should be displayed.

(Second Embodiment)

In the above first embodiment, the facsimile apparatus was explained by way of example. However, the present invention is applicable to a data communication apparatus which supports plural protocols.

Hereinafter, such the data communication apparatus will be explained by way of example.

Figure 5:
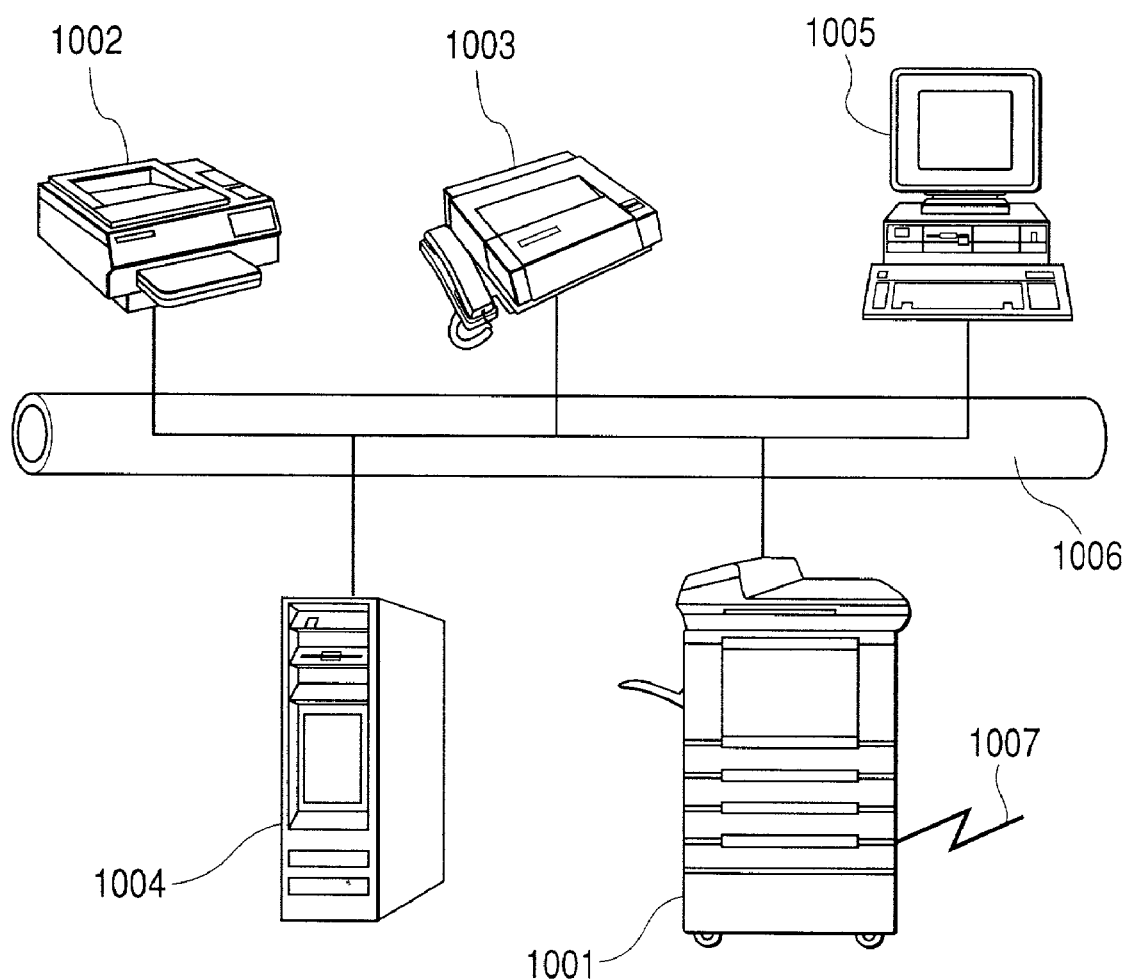
FIG. 5 is a diagram showing a system to which a digital multifunctional machine 1001 according to the second embodiment of the present invention is connected.

FIG. 5 shows a system to which the data communication apparatus according to the second embodiment is connected.

A digital multifunctional machine 1001 is a data communication apparatus which can read an original and transmit data according to various protocols. A printer 1002 is a printing apparatus which can print an image on the basis of print data transmitted from the digital multifunctional machine 1001. A facsimile 1003 is a facsimile apparatus which can receive facsimile data transmitted from the digital multifunctional machine 1001. A database/mail server 1004 is a computer which exchanges database data and E-mail (electronic-mail) data transmitted from the digital multifunctional machine 1001. A client computer 1005 is a computer which captures various data from the connected database/mail server 1004, stores the captured data, and displays images on the basis of the stored data. A network 1006 is a network to which plural apparatuses such as the digital multifunctional machine 1001, the printer 1002, the facsimile 1003, the database/mail server 1004, the client computer 1005 and the like are connected. The network 1006 exchanges the data with the connected apparatuses according to predetermined protocols. A telephone line 1007 is connected to an external public network through a modem disposed in the digital multifunctional machine 1001.

Figure 6:
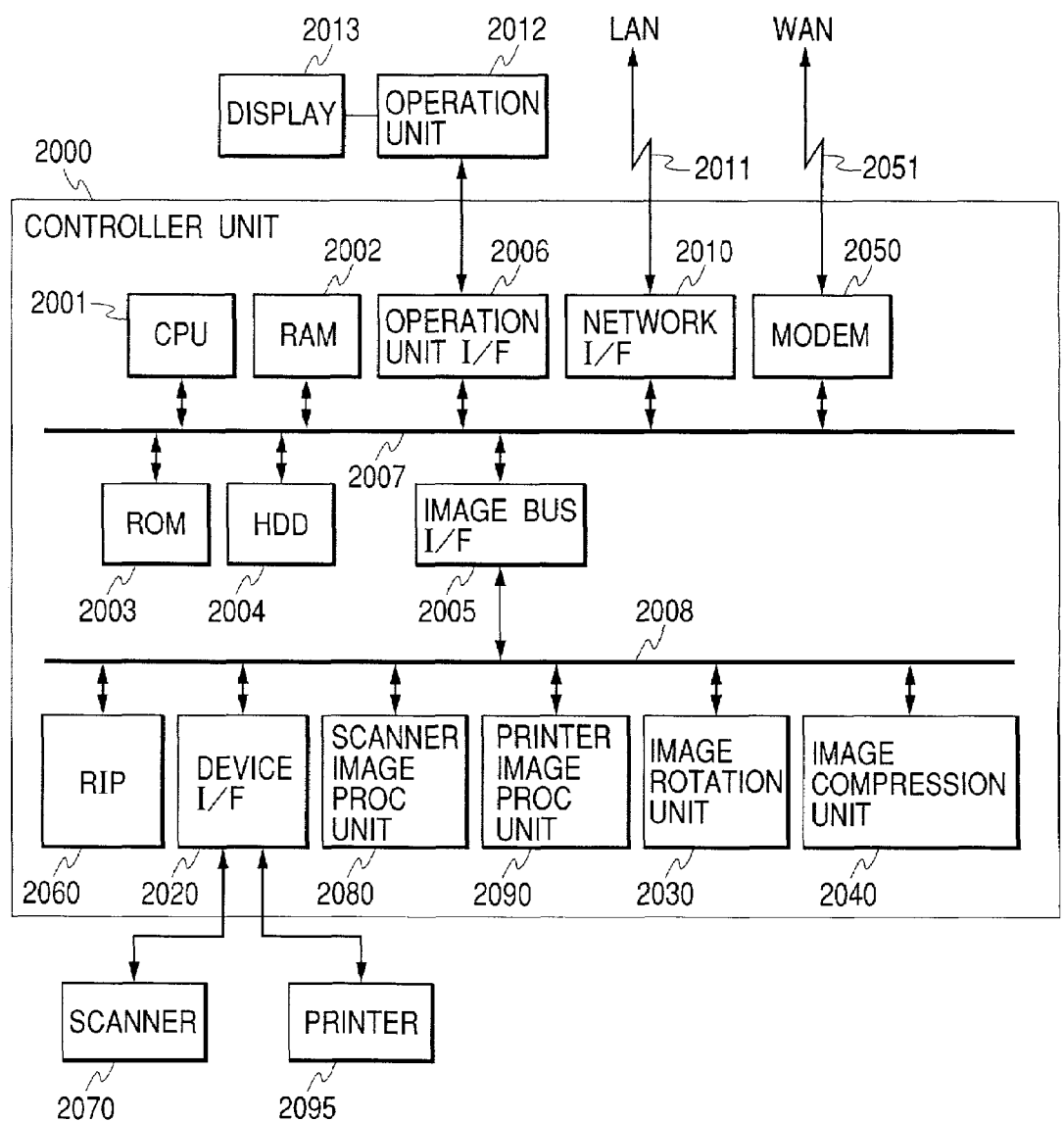
FIG. 6 is a block diagram showing a schematic structure of the digital multifunctional machine 1001.

FIG. 6 is a system block diagram showing the schematic structure of the digital multifunctional machine shown in FIG. 5.

In FIG. 6, a controller unit 2000 is connected to a scanner 2070 acting as an image input device and a printer 2095 acting as an image output device, and equal connected to a LAN (local area network) 2011 (i.e., the network 1006 in FIG. 5) and a WAN (wide area network) 2051 (i.e., the telephone line 1007 in FIG. 5). Thus, the controller unit 2000 inputs and outputs image information and device information.

A CPU 2001 is a controller which controls the entire system, a RAM 2002 is a system working memory which is used when the CPU 2001 operates. Also, the RAM 2002 temporarily stores the image data. A ROM (read-only memory) 2003 is a boot ROM which stores a boot program for the system. An HDD (hard disk driver) 2004 stores system software and the image data.

An operation unit I/F (interface) 2006 is an interface unit for an operation unit (UI (user interface)) 2012. The operation I/F 2006 outputs the image data to be displayed on a display 2013, to the operation unit 2012, and further transfers to the CPU 2001 information input by a system user from the operation unit 2012. The display 2013 is a liquid crystal display unit of touchscreen form which displays various information (a transmission situation, no sheet, an ink empty, etc.) on the basis of information received from the controller unit 2000. When the transmission situation is displayed, histories (situations) of plural transmission documents can be simultaneously displayed on one screen. If the histories of all the transmission documents can not be displayed on one screen, the screen is scrolled by a predetermined operation to display the histories of all the transmission documents. The history of the transmission document includes an acceptance time (a time when the transmission document is stored in the HDD 2004), a destination name, a transmission number to specify the transmission document, and a transmission situation. Here, in the transmission situation, when the transmission is started for one transmission document, a message "IN TRANSMISSION" to which shading has been applied is displayed for this document. In case of batch transmission, shading is applied only to the documents which are being transmitted actually, but shading is not applied to the documents which are the batch transmission targets but on standby for transmission, i.e., only the message "IN TRANSMISSION" is displayed for such the documents which are not yet actually batch-transmitted. Such the display is substantially the same as that in the above first embodiment except for the point that plural kinds of protocols (plural information respectively depending on these kinds of protocols) are provided in the present embodiment.

A network I/F 2010 which is connected to the LAN 2011 inputs and outputs various information through the LAN 2011. A modem 2050 which is connected to the WAN 2051 inputs and outputs various information through the WAN 2051. Further, the modem 2050 holds plural lines, and thus can perform plural communications simultaneously by using these lines. When plural transmission documents for an identical destination exist in the HDD 2004, the modem 2050 can batch and transmit these documents in one-time communication.

The above devices are appropriately arranged on a system bus 2007.

An image bus I/F 2005 is a bus bridge by which the system bus 2007 and an image bus 2008 for transferring image data at high speed are connected to each other so as to convert data structure. The image bus 2008 is made by a PCI (peripheral component interface) bus or an IEEE1394 (Institute of Electrical and Electronic Engineers standard 1394) bus. On the image bus 2008, following devices are arranged.

An RIP (raster image processor) 2060 expands a PDL (page description language) code into an bit map image. A device I/F 2020 connects the scanner 2070 and the printer 2095 being the image input and output devices to the controller unit 2000, and performs synchronous/asynchronous conversion to the image data. A scanner image processing unit 2080 corrects, processes and edits the input image data. A printer image processing unit 2090 performs correction, resolution conversion and the like to print output image data in accordance with a printer format. An image rotation unit 2030 rotates the image data. An image compression unit 2040 performs compression/decompression process to the image data. Concretely, the image compression unit 2040 performs image compression to multivalue image data based on JPEG (Joint Photographic Experts Group), and performs image compression to binary image data based on JBIG (Joint Bi-level Image experts Group), MMR (Modified Modified READ (relative element address) coding) or MH (Modified Huffman coding).

In the present embodiment, the digital multifunctional machine can perform, through the LAN 2011 and/or the WAN 2051, at least facsimile transmission, E-mail transmission (including IFAX (Internet facsimile) transmission), and ftp (file transfer protocol) transmission of an image file or the like. Here, it should be noted that, in the IFAX transmission, an E-mail which has an image read by the scanner 2070 as an attachment file is transmitted.

Figure 7:
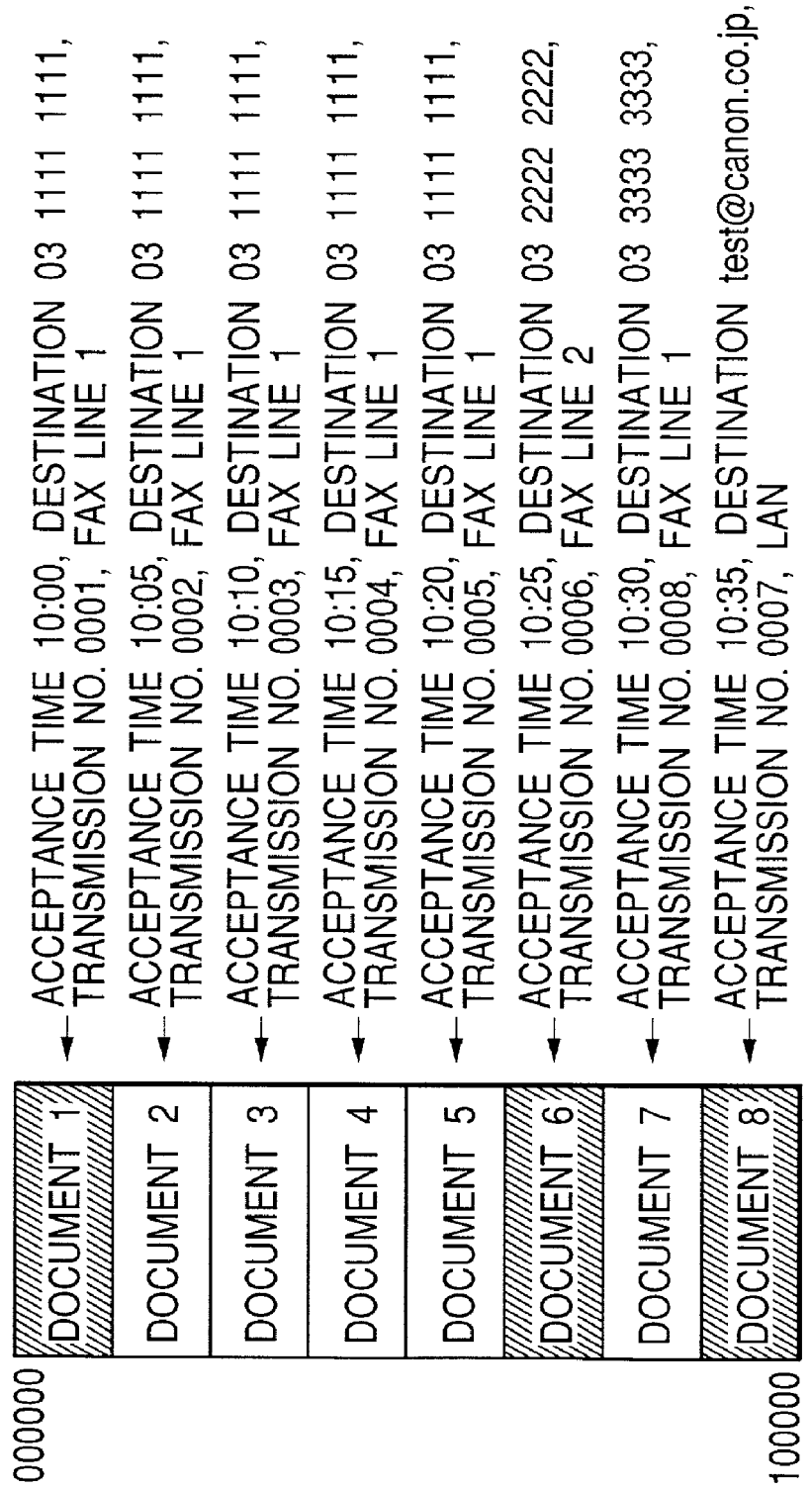
FIG. 7 is a diagram showing an example of documents stored in a RAM (random-access memory) 2002 of the digital multifunctional machine 1001.

FIG. 7 is a diagram showing an example of the contents of the documents stored in the RAM 2002 according to the present embodiment.

In the present embodiment, the documents are stored in the RAM 2002 in the order of input, i.e., the order of documents 1, 2, 3, 4, 5, 6, 7 and 8.

As the contents of the document 1, an acceptance time (a time of storage) "10:00", a destination "03 1111 1111", and a facsimile line 1 are set.

As the contents of the document 2, similarly, an acceptance time (a time of storage) "10:05", the destination "03 1111 1111", and the facsimile line 1 are set.

As the contents of the document 3, similarly, an acceptance time (a time of storage) "10:10", the destination "03 1111 1111", and the facsimile line 1 are set.

As the contents of the document 4, similarly, an acceptance time (a time of storage) "10:15", the destination "03 1111 1111", and the facsimile line 1 are set.

As the contents of the document 5, similarly, an acceptance time (a time of storage) "10:20", the destination "03 1111 1111", and the facsimile line 1 are set.

As the contents of the document 6, similarly, an acceptance time (a time of storage) "10:25", a destination "03 2222 2222", and the facsimile line 2 are set.

As the contents of the document 7, similarly, an acceptance time (a time of storage) "10:30", a destination "03 3333 3333", and the facsimile line 1 are set.

As the contents of the document 8, similarly, an acceptance time (a time of storage) "10:30", the destination "test@canon.co.jp", and mail (IFAX) transmission are set.

FIGS. 8 to 10 are diagrams showing the transmission situation screens displayed on the display 2013 according to the present embodiment.

FIG. 8 shows a first page of the transmission situation screen displayed on the display 2013, and FIG. 9 shows a second page of the transmission situation screen.

In the screen, "FAX", "IFAX", "ftp" and "ALL" buttons can be handled by an operator. By depressing each of the "FAX", "IFAX" and "ftp" buttons, the transmission situation of the corresponding transmission protocol can be displayed. Further, by depressing the "ALL" button, all transmission jobs can be displayed.

Here, in the transmission situations (the transmission histories) displayed on the display 2013, the histories of the five documents are displayed on the first page of the screen. If the transmission histories of the documents exceeding five histories are to be displayed, the transmission situation screen is scrolled by a predetermined operation, whereby the histories of the documents incapable of being displayed on the first page are displayed on the next page scrolled (i.e., the second page).

In the above case, until the transmission is started, the documents are displayed on the transmission situation screen in the order that these documents were stored in the RAM 2002 (i.e., the order of the documents 1, 2, 3, 4, 5, 6, 7 and 8). In a case where the order remains even after the start of transmission and it is intended to stop transmitting the document 6 to a destination II, there is a possibility that necessity for scrolling the screen comes out in order to search the history of the document 6 existing after the documents 1 to 5 prestored in the RAM 2002.

In the present embodiment, as shown in FIG. 8, since the documents (i.e., the documents 1, 6 and 8) just being transmitted are shifted uppermost and displayed on the transmission situation screen, even the transmission to the destinations II and III can be easily stopped.

When the batch transmission is started, the documents to be batched and transmitted (i.e., the documents 1, 2, 3, 4 and 5) are all displayed with the message "IN TRANSMISSION" on the screen. In this case, if it is instructed to stop the transmission without selecting any specific document, the target for which the transmission can be stopped is only the document being actually transmitted (i.e., the document 1), whereby this document is displayed uppermost. After the transmission of the document 1 ended, since the transmission of the document 2 starts, the history of this document 2 is shifted upward. Although it is not shown in the drawings, even if the transmission standby document (e.g., a timer transmission document or the like) to the other destination exists between the documents 1 and 2, the document 2 is shifted to skip over it. Further, if it is instructed to stop the transmission while the transmission is being performed, the document being actually transmitted (i.e., the shading documents) is the target for which the transmission should be stopped. The process to stop the transmission in the present embodiment is substantially the same as that already explained in the first embodiment.

FIG. 10 shows the transmission situation screen which is displayed when the "FAX" button is depressed on the screen shown in FIG. 8.

Figure 11:
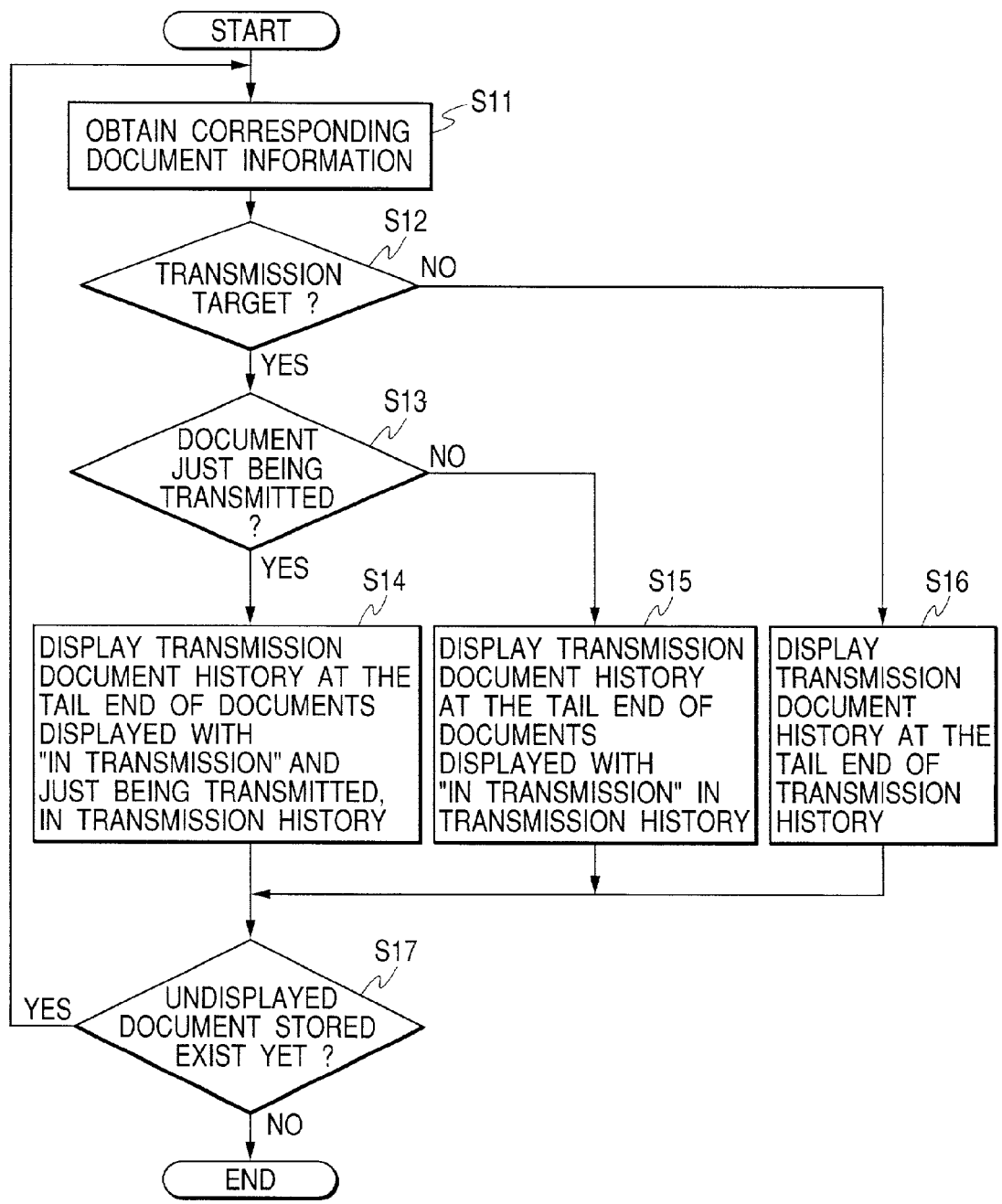
FIG. 11 is a flow chart showing an operation to cause the display 2013 to display a transmission situation.

Next, a flow of an operation to display the transmission histories in the present embodiment will be explained. FIG. 11 is a flow chart showing the operation to display the transmission histories.

First, in a step S11, transmission situation information which represents that, e.g., the corresponding documents are being transmitted in the order of storage (the first document is the document 1), and/or the transmission is on standby, and information which represents whether or not the document (the transmission stop target document) for which the transmission should be stopped (i.e., the documents 1, 6 and 8 in the present embodiment) are obtained from the RAM 2002 shown in FIG. 7.

Next, in a step S12, it is judged whether or not the corresponding document is the target to be transmitted and to be displayed with the message "IN TRANSMISSION" (including the case where the target is displayed with the message "IN TRANSMISSION" in the batch transmission). If YES in the step S12, the flow advances to a step S13. Conversely, if NO in the step S12 (i.e., if the target is displayed with the message "IN WAIT FOR TRANSMISSION" (including waiting because of timer transmission) other than the message "IN TRANSMISSION"), the flow advances to a step S16.

Next, if it is judged in the step S13 that the corresponding document is the document just being transmitted (i.e., the documents 1, 6 and 8 in the present embodiment), the flow advances to a step S14. Conversely, if it is judged in the step S13 that the corresponding document is not the document just being transmitted (e.g., the document which is other than the document just being transmitted in the batch transmission and is merely displayed with the message "IN TRANSMISSION"), the flow advances to a step S15.

In the step S14, the history of the corresponding transmission document is displayed at the tail end of the histories of the documents being displayed with the message "IN TRANSMISSION" and just being transmitted.

Similarly, in the step S15, the history of the corresponding transmission document is displayed at the tail end of the histories of the documents being displayed with the message "IN TRANSMISSION".

Similarly, in the step S16, the history of the corresponding transmission document is displayed at the tail end of the histories of the documents.

Next, in a step S17, it is judged whether or not there is the stored document not yet displayed. If YES in the step S17, the flow returns to the step S11. Conversely, if NO in the step S17, i.e., if all the stored documents are displayed, the transmission document history display sequence ends.

Figure 12:
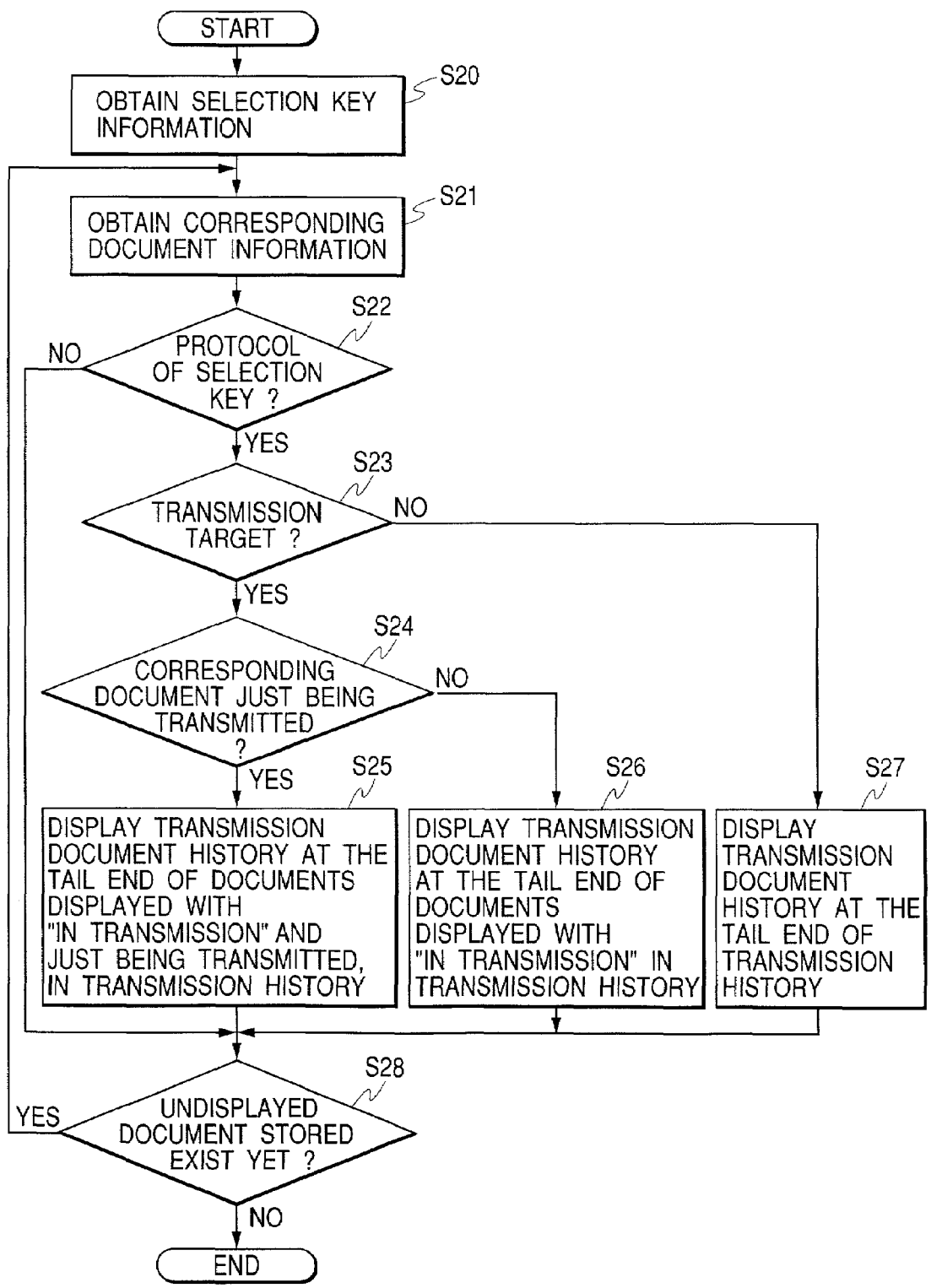
FIG. 12 is a flow chart showing an operation to cause the display 2013 to display the transmission situation for each protocol.

FIG. 12 is a flow chart showing an operation to cause the display 2013 to display the transmission histories of the protocols selected by the user, as shown in FIG. 10.

First, in a step S20, the selection key information in a case where the transmission protocol selection button such as the "FAX", "IFAX" or "ftp" button in FIGS. 8 and 9 is depressed by the user is obtained. Here, if it is judged that the "ALL" button is depressed, it means that all the transmission jobs are displayed.

Next, in a step S21, transmission situation information which represents that, e.g., the corresponding documents are being transmitted in the order of storage (the first document is the document 1), and/or the transmission is on standby, information which represents whether or not the document (the transmission stop target document) for which the transmission should be stopped (i.e., the documents 1, 6 and 8 in the present embodiment), and transmission protocol information are obtained from the RAM 2002 shown in FIG. 7.

Next, in a step S22, it is judged whether or not the transmission protocol of the corresponding document coincides with the transmission protocol information selected in the step S20. Then, the flow advances to a step S23 if judged that the transmission protocol of the corresponding document coincides with the transmission protocol information, while the flow advances to a step S28 if judged that the transmission protocol of the corresponding document does not coincide with the transmission protocol information. Further, if the "ALL" button is selected in the step S20, the flow skips to the step S23.

Next, in the step S23, it is judged whether or not the corresponding document is now the target to be transmitted and to be displayed with the message "IN TRANSMISSION" (including the case where the target is displayed with the message "IN TRANSMISSION" in the batch transmission). If YES in the step S23, the flow advances to a step S24. Conversely, if NO in the step S12 (i.e., if the target is displayed with the message "IN WAIT FOR TRANSMISSION" (including waiting because of timer transmission) other than the message "IN TRANSMISSION"), the flow advances to a step S27.

Next, if it is judged in the step S24 that the corresponding document is the document just being transmitted (i.e., the documents 1, 6 and 8 in the present embodiment), the flow advances to a step S25. Conversely, if it is judged in the step S24 that the corresponding document is not the document just being transmitted (e.g., the document which is other than the document just being transmitted in the batch transmission and is merely displayed with the message "IN TRANSMISSION"), the flow advances to a step S26.

Next, in the step S25, the history of the corresponding transmission document is displayed at the tail end of the histories of the documents being displayed with the message "IN TRANSMISSION" and just being transmitted.

Similarly, in the step S26, the history of the corresponding transmission document is displayed at the tail end of the histories of the documents being displayed with the message "IN TRANSMISSION".

Similarly, in the step S27, the history of the corresponding transmission document is displayed at the tail end of the histories of the documents.

Next, in the step S28, it is judged whether or not there is the stored document not yet displayed. If YES in the step S28, the flow returns to the step S21. Conversely, if NO in the step S28, i.e., if all the stored documents are displayed, the transmission document history display sequence ends.

FIG. 13 is a flow chart showing an operation of the present embodiment in a case where the user causes the display 2013 to display (or select) the transmission situation screen as shown in FIG. 8 to know the transmission situation.

First, in a step S30, it is judged whether or not the job being in transmission exists. If judged that the job being in transmission exists, the flow advances to a step S31, while if judged that the job being in transmission does not exist, the flow advances to a step S32.

Next, in the step S31, protocol information of the job being in transmission is obtained.

In the step S32, since the job being in transmission does not exist, protocol information which can be set and registered by the user and has been saved in a priority display protocol information area in the RAM 2002 is obtained. Here, if there is no registration of the priority display, information representing that all the protocols should be displayed is obtained.

Next, in a step S33, transmission situation information which represents that, e.g., the corresponding documents are being transmitted in the order of storage (the first document is the document 1), and/or the transmission is on standby, information which represents whether or not the document (the transmission stop target document) for which the transmission should be stopped (i.e., the documents 1, 6 and 8 in the present embodiment), and transmission protocol information are obtained from the RAM 2002 shown in FIG. 7.

Next, in a step S34, it is judged whether or not the transmission protocol of the corresponding document coincides with the transmission protocol information selected in the steps S31 and S32. Then, the flow advances to a step S35 if judged that the transmission protocol of the corresponding document coincides with the transmission protocol information, while the flow advances to a step S40 if judged that the transmission protocol of the corresponding document does not coincide with the transmission protocol information.

Next, in the step S35, it is judged whether or not the corresponding document is now the target to be transmitted and to be displayed with the message "IN TRANSMISSION" (including the case where the target is displayed with the message "IN TRANSMISSION" in the batch transmission). If YES in the step S35, the flow advances to a step S36. Conversely, if NO in the step S35 (i.e., if the target is displayed with the message "IN WAIT FOR TRANSMISSION" (including waiting because of timer transmission) other than the message "IN TRANSMISSION"), the flow advances to a step S39.

Next, if it is judged in the step S36 that the corresponding document is the document just being transmitted (i.e., the documents 1, 6 and 8 in the present embodiment), the flow advances to a step S37. Conversely, if it is judged in the step S36 that the corresponding document is not the document just being transmitted (e.g., the document which is other than the document just being transmitted in the batch transmission and is merely displayed with the message "IN TRANSMISSION"), the flow advances to a step S38.

Next, in the step S37, the history of the corresponding transmission document is displayed at the tail end of the histories of the documents being displayed with the message "IN TRANSMISSION" and just being transmitted.

Similarly, in the step S38, the history of the corresponding transmission document is displayed at the tail end of the histories of the documents being displayed with the message "IN TRANSMISSION".

Similarly, in the step S39, the history of the corresponding transmission document is displayed at the tail end of the histories of the documents.

Next, in the step S40, it is judged whether or not there is the stored document not yet displayed. If YES in the step S40, the flow returns to the step S33. Conversely, if NO in the step S40, i.e., if all the stored documents are displayed, the transmission document history display sequence ends.

It should be noted that the flow charts shown in FIGS. 11 to 13 are based on the control which is performed by the CPU 2001 according to the program loaded from the HDD 2004 to the RAM 2002.

As described above, according to the second embodiment, in the apparatus which can transmit the documents by the plural protocols, it is possible to display the transmission situations for each desired protocol, all the batched transmission documents, the document of the in-transmission protocol, or the document of the preset protocol. Thus, it is possible to easily specify the document just being transmitted.

In the present embodiment, the document just being transmitted is shifted uppermost and displayed. Conversely, such the document may be shifted lowermost and displayed. Further, the screen may be automatically scrolled to display the document just being transmitted within the display area.

Further, in the present embodiment, "FAX", "IFAX" and "ftp" are described as the transmission protocols by way of example. However, as well as these protocols, other protocols can be appropriately adopted.

Further, in the first and second embodiments, it is needless to say that, after the transmission situations were displayed according to the above conditions, it is possible for the operator to appropriately change the display order according to a predetermined condition.

Further, in the first and second embodiments, only the document just being transmitted is shifted. However, it is possible to shift and display all the documents being the transmission targets in the transmission process.

The present invention is applicable to a system which is composed of plural equipments (e.g., a host computer, an interface device, a reader, a printer, a communication unit, etc.) or to an apparatus which includes a single equipment (e.g., a communication device such as a facsimile or the like).

Further, the present invention includes a case where program codes of software to realize the functions of the above embodiments are supplied to a computer in an apparatus or a system connected to various devices to operate them to achieve the functions of the above embodiments, and the computer (CPU or MPU) in the system or the apparatus reads and executes the supplied program codes and thus operates the various devices.

In this case, the program codes themselves of software achieve the functions of the above embodiments, whereby the program codes themselves and a means for supplying the program codes to the computer, e.g., a storage medium storing these program codes, constitute the present invention.

As the storage medium storing the program codes, e.g., a floppy disk, a hard disk, an optical disk, a magnetooptical disk, a CD-ROM, a magnetic tape, a nonvolatile memory card, a ROM, or the like can be used.

Further, it is needless to say that the program codes are included in the embodiment of the present invention not only in the case where the functions of the above embodiments are achieved by executing the program codes with the computer, but also in a case where the program codes cooperate with an OS (operating system) or other application software operating in the computer to achieve the functions of the above embodiments.

Further, it is needless to say that the present invention further includes a case where the supplied program codes are once stored in a memory provided in a function expansion board of the computer or a function expansion unit connected to the computer, and then a CPU or the like provided in the function expansion board or the function expansion unit executes all or a part of actual processes according to instructions of the supplied program codes, whereby the functions of the above embodiments are achieved.

Although the present invention has been described with reference to the above embodiments, the present invention is not limited to them but encompasses any and all modifications or combinations within the spirit and scope of the appended claims.

What is claimed is:

1. A data communication apparatus comprising:
    a memory for storing plural data;
    transmission means for transmitting the plural data stored in said memory;
    display means for displaying situations of the plural data stored in said memory; and
    control means for performing, in a case of displaying the situations on said display means, control to change order of display of the data being transmitted by said transmission means,
    wherein said display means displays the situations of the data not being transmitted by said transmission means, in order of storing these data in said memory.

2. An apparatus according to claim 1, wherein said control means performs control to shift upward the data being transmitted by said transmission means and cause said display means to display the shifted data.

3. An apparatus according to claim 1, wherein said control means performs control to shift downward the data being transmitted by said transmission means and cause said display means to display the shifted data.

4. An apparatus according to claim 1, wherein
    said transmission means simultaneously transmits the plural data through plural lines, and
    said control means changes, in the situations of the plural data being transmitted by said transmission means, the order of display while enabling discrimination of the used lines respectively.

5. An apparatus according to claim 1, wherein
    said transmission means can perform batch transmission of the plural different data, and said control means causes the data being transmitted by said transmission means to be discriminated from the other data subjected to the batch transmission, and to be displayed.

6. An apparatus according to claim 1, wherein said display means displays the situations incapable of being displayed at one time, by scrolling a screen.

7. An apparatus according to claim 6, wherein said control means automatically scrolls the screen such that the data being transmitted by said transmission means are displayed in a display area of said display means.

8. An apparatus according to claim 1, wherein
said transmission means can transmit the data by plural protocols, and
said control means causes the situations to be displayed such that it is possible to discriminate by which protocol the data is transmitted with said transmission means.

9. An apparatus according to claim 8, wherein said control means causes to display the situations in a state that the plural protocols exist mixedly.

10. An apparatus according to claim 8, further comprising designation means for designating a desired protocol, and
wherein said control means causes the situation of the protocol designated by said designation means to be displayed.

11. An apparatus according to claim 8, wherein said control means causes the situation of the protocol of the data being transmitted by said transmission means to be displayed preferentially.

12. An apparatus according to claim 8, further comprising setting means for setting the protocol to be preferentially displayed, and
wherein said control means causes the situation of the protocol set by said setting means to be displayed preferentially.

13. A data communication method comprising:
a display step of causing a display apparatus to display situations of plural data stored in a memory, so as to cause a data communication apparatus to transmit these data;
a judgment step of judging whether or not, in the plural data stored in the memory, any data is being transmitted by the data communication apparatus; and
a change step of changing order of display of the data judged in said judgment step as being transmitted by the data communication apparatus,
wherein said display step includes displaying the situations of the data not being transmitted by the data communication apparatus, in order of storing these data in the memory.

14. A method according to claim 13, wherein said change step includes performing control to shift upward the data being transmitted by the data communication apparatus and causing display of the shifted data.

15. A method according to claim 13, wherein said change step includes performing control to shift downward the data being transmitted by the data communication apparatus and causing display of the shifted data.

16. A method according to claim 13, wherein
the data communication apparatus simultaneously transmits the plural data through plural lines, and
said change step includes changing, in the situations of the plural data being transmitted by the data communication apparatus, the order of display while enabling discrimination of the used lines respectively.

17. A method according to claim 13, wherein
the data communication apparatus can perform batch transmission of the plural different data, and
said change step includes causing the data being transmitted by the data communication apparatus to be discriminated from the other data subjected to the batch transmission, and to be displayed.

18. A method according to claim 13, wherein said display step includes displaying the situations incapable of being displayed at one time, by scrolling a screen.

19. A method according to claim 18, wherein said change step includes automatically scrolling the screen such that the data being transmitted by the data communication apparatus are displayed in a display area of the display apparatus.

20. A method according to claim 13, wherein
the data communication apparatus can transmit the data by plural protocols, and
said change step includes causing the situations to be displayed such that it is possible to discriminate by which protocol the data is transmitted with the data communication apparatus.

21. A method according to claim 20, wherein said change step includes causing the situations to be displayed in a state that the plural protocols exist mixedly.

22. A method according to claim 20, further comprising a designation step of designating a desired protocol, and
wherein said change step includes causing the situation of the protocol designated in said designation step to be displayed.

23. A method according to claim 20, wherein said change step includes causing the situation of the protocol of the data being transmitted by the data communication apparatus to be displayed preferentially.

24. A method according to claim 20, further comprising a setting step of setting the protocol to be preferentially displayed, and
wherein said change step includes causing the situation of the protocol set in said setting step to be displayed preferentially.

25. A program which is stored in a computer-readable memory and can be executed by a computer, the program having code for performing a method comprising:
a display step of causing a display apparatus to display situations of plural data stored in a memory, so as to cause a data communication apparatus to transmit these data;
a judgment step of judging whether or not, in the plural data stored in the memory, any data are being transmitted byte data communication apparatus; and
a change step of changing order of display of the data judged in said judgment step as being transmitted by the data communication apparatus,
wherein said display step includes displaying the situations of the data not being transmitted by the data communication apparatus, in order of storing these data in the memory.

* * * * *

UNITED STATES PATENT AND TRADEMARK OFFICE
CERTIFICATE OF CORRECTION

| | | |
|---|---|---|
| PATENT NO. | : 7,031,033 B2 | |
| APPLICATION NO. | : 09/938574 | |
| DATED | : April 18, 2006 | |
| INVENTOR(S) | : Takako Asahi | |

It is certified that error appears in the above-identified patent and that said Letters Patent is hereby corrected as shown below:

ON THE TITLE PAGE ITEM [56] REFERENCES CITED:

Foreign Patent Documents, "JP 41119926 * 4/1999" should read
--JP 11-119926 * 4/1999-- and
"JP 2002152447 * 5/2002" should read
--JP 2002-152447 * 5/2002--.

COLUMN 5:

Line 48, "inquiry" should read --inquiry as to--.

COLUMN 6:

Line 2, "flowing" should read --transmitted--.

COLUMN 7:

Line 55, "equal" should read --equally--.

COLUMN 14:

Line 51, "cause" should read --causes--; and
Line 55, "cause" should read --causes--.

UNITED STATES PATENT AND TRADEMARK OFFICE
CERTIFICATE OF CORRECTION

PATENT NO. : 7,031,033 B2
APPLICATION NO. : 09/938574
DATED : April 18, 2006
INVENTOR(S) : Takako Asahi It is certified that error appears in the above-identified patent and that said Letters Patent is hereby corrected as shown below:

COLUMN 16:

Line 53, "byte" should read --by the--.

Signed and Sealed this

Twelfth Day of December, 2006

JON W. DUDAS
*Director of the United States Patent and Trademark Office*